(12) United States Patent
Hagen et al.

(10) Patent No.: US 6,420,028 B1
(45) Date of Patent: Jul. 16, 2002

(54) COATED POLYMER ARTICLE AND ITS USE

(75) Inventors: Steinar Hagen, Hagan; Rune Ringberg, Oslo; Geir Fonnum, Rasta, all of (NO)

(73) Assignee: Amersham Pharmacia Biotech AB, Uppsala (SE)

( * ) Notice: Subject to any disclaimer, the term of this patent is extended or adjusted under 35 U.S.C. 154(b) by 0 days.

(21) Appl. No.: 09/446,672

(22) PCT Filed: Jun. 22, 1998

(86) PCT No.: PCT/SE98/01205

§ 371 (c)(1),
(2), (4) Date: May 15, 2000

(87) PCT Pub. No.: WO98/58734

PCT Pub. Date: Dec. 30, 1998

(30) Foreign Application Priority Data

Jun. 25, 1997 (NO) .............................................. 9702427

(51) Int. Cl.$^7$ ................................................ B32B 5/16
(52) U.S. Cl. ...................... 428/403; 428/407; 428/516; 428/520; 427/220; 427/221; 210/198.2; 210/502; 210/504; 210/503; 210/506; 210/635; 210/638; 210/656
(58) Field of Search ................................. 428/407, 403, 428/516, 520; 210/198.2, 503, 506, 502.1, 504, 638, 635, 656; 427/220, 221

(56) References Cited

U.S. PATENT DOCUMENTS 5,030,352 A * 7/1991 Vorady et al. ........... 210/507.1
5,503,933 A * 4/1996 Afeyan et al. .............. 428/407

* cited by examiner

*Primary Examiner*—L. Kiliman
(74) *Attorney, Agent, or Firm*—Royal N. Ronning, Jr.; Robert F. Chisholm; Stephen G. Ryan

(57) ABSTRACT

A polymer article having structure (I), where P comprises the basic polymer and groups —L—CH(—X($R_1$)$_p$)—$CH_2$(—Y($R_2$)$_p$); L is a part of a pending group utilized for introducing —X($R_1$)$_p$ and —Y($R_2$)$_p$; X and Y are halogen, N, S and O; $R_1$ is hydrogen, alkyl, acyl or $R_2$ when X is N, O or S; $R_2$ is hydrogen, alkyl, alkylaryl or arylalkyl in which the alkyl part may contain 1–18 carbons, or —$R_3$(—NH—$CR_4$=O)$_q$ or —$R_3$(—$NH_2$)$_q$, —$CR_4$=O or poly alkyloxy that may have been terminally acylated or alkylated; p is an integer 0–3, with the provisos a) p depends on X being halogen, O, S or N, and b) that if several groups $R_2$ are present they may be identical or different; $R_3$ is alkyl, —O-alkyl, hydroxyalkyl, phenylalkyl, with up to 18 carbon atoms in the alkyl part, and $R_4$ is $C_{1-18}$ alkyl. q is an integer>0 representing that one or more hydrogens in $R_3$ may have been replaced with —$NH_2$ or —NH—$CR_4$=O. The polymer article may be used as a chromatography separation medium or in solide phase oligonucleotide synthesis.

6 Claims, No Drawings

COATED POLYMER ARTICLE AND ITS USE

TECHNICAL FIELD AND BACKGROUND ART

The present invention relates to coated polymer articles and processes for the production thereof and use of the article as chromatography medium. Specifically the invention relates to coated articles with the coating covalently bound to the polymer surface via pending double bonds of the polymer surface. An example of pending groups are residual vinyl groups remaining after polymerisation of vinyl monomers, such as divinyl benzene monomers.

In the context of the present invention the term "coated"/"coating" means that pending alken groups on the surface has been derivatized to introduce novel functionaities that may be adapted to two specific uses of the article (chromatographic support and support for oligopeptide and oligonucleotide synthesis). "Coat" thus has a somewhat different meaning compared to coating in the sense of physical adsorption and stabilization by crosslinking of an adsorbed layer (coat) within the layer and/or to the original surface.

The stationary phase (support, matrix) in liquid chromatography is composed of a porous matrix and is most commonly in bead form. A wide variety of materials are used for chromatography matrices, both inorganic and organic materials. The demands on the matrix are several. It should be chemically and physically stable and be able to withstand extreme pH conditions. The matrix should be rigid to allow high flow rates in columns packed with particles of small diameters. It must also be possible to produce particles with a broad range of porosities.

The surface characteristics of the matrix is important. By introduction of new chemical structures on the surface of the matrix it is possible to design stationary phases which interact more or less specifically with a particular molecule. In chromatographic separation of proteins in aqueous solution the matrix is usually hydrophilic. In reversed phase chromatography (RPC) for peptide or protein separation, silica gels have been used as chromatography medium. Silica gels are rigid enough to withstand high flow rates and different hydrophobicities are available (C4, C8, C18). However, silica gels are not stable above pH 8.0 and hence can not be cleaned by using alkali. In stead it is common to use rigid matrices of organic polymers e.g. polymethacrylate or polystyrene/polystyrene-divinylbenzene. Polystyrene-divinylbenzene particles are hydrophobic in aqueous solutions and large amounts of organic solvents have to be used to eluate the absorbed molecules. The selectivity is also limited. Due to the fact that there is only a small variation in hydrophobicity of these particles, the use of them is limited. In contrast the ratio hydrophobicity/hydrofilicity of silica particles can be varied by chemical reactions. There are a large variety in chemistry available for modification of the hydrofilic silica surface. To increase the possibilities to use particles of polystyrene-divinylbenzene and other hydrophobic polymers, it is recognized that the surface of the particles must be modified to be more hydrophilic before they can be used as chromatographic separation medium. Different methods have been suggested for hydrophilisation of the surface of particles based on hydrophobic polymers:

WO 91/11241 relates to a method of producing a hydrophilic coating on a hydrophobic surface by which a compound comprising a hydrophobic and a hydrophilic domain is adsorbed on the surface. The draw backs with this method are several. The polymer to be adsorbed has a high molecular weight and therefore the polymer will not spread out evenly in all pores. The control of the pore size distribution is then lost and some pores may not even be coated at all. As the polymer coating is only adsorbed it may loosen from the surface at contacting with non-polar solvents. Therefore the coating must be cross-linked.

WO 95/23022 discloses a method of covalently bonding a hydrophilic coating on a hydrophobic surface. An unsaturated polymer coating is grafted to the surface via the unsaturated groups on the surface. Also with this method there is the same problem of obtaining the coating evenly distributed on the porous surface of the matrix.

Various uses of vinyl groups pending on vinyl benzene polymers have been reviewed during the priority year by Hubbard et al (Reactive Functional Polymers 36 (1998) 1–16 and 17–30). The use of pending vinyl groups for immobilizing a catalyst on a macroporous polystyrene resin has been described by Faber et al (Reactive Polymers 11 (1989) 117–126. Modifying chromatographic vinyl-benzene based supports by routes other than via residual vinyls has been described by Sun et al (J, Chromatog, 522 (1990) 95–105). Still another route has been described by Moberg et al (Reactive Polymers 15 (1991) 25–35).

OBJECTIVES OF THE INVENTION

The object of the present invention is to obtain improved coated polymer articles and improved methods of coating a polymer article to change the surface characteristics of the article without the draw backs of known methods.

A further object of the invention is to produce polymer particles with suitable surface characteristics for chromatographic use.

It is a further object of the invention to provide a coating which may be derivatized to produce a wide range of different functional groups for use in different types of chromatography. The intention is to be able to achieve a large variety in both hydrophobicity/hydrophilicity and selectivity and to reduce the amount of solvent used in the elution.

The demands on supports to be used in the synthesis of oligonucleotides and oligopeptides with respect to the balance between hydrophobicity and hydrophilicity are less critical than for chromatographic matrices, although it remains that maintaining open pores is important in order to maintain high capacity of a given porous support. The primary object in this aspect of the invention is to provide a simple well-defined way of introducing a handle in form of a primary or secondary amino group into a polymer support based on a hydrophobic polymer.

THE INVENTION

The objects of the invention are achieved by the polymer articles and methods defined in the claims. According to the invention a coated polymer article is obtained, which article is characterized in that the coating is covalently bound to the polymer surface via double bonds of the polymer. The article has the structure:

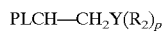

where
P comprises the basic polymer structure of the article before coating and further groups

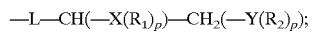

L is a part of a pending group projecting from the basic polymer and comprising the double bonds utilized for introducing —X(R$_1$)$_p$ and —Y(R$_2$)$_p$. It may be a single covalent link to the basic polymer or a benzene ring.

X and Y are independently selected from halogens, in particular Br, and N, S and O. R$_1$ is hydrogen, a straight, branched or cyclic alkyl or acyl group, such as C$_1$–C$_{10}$ alkyl, C$_1$–C$_{18}$ acyl, or R$_2$ when X is N, O or S with particular emphasis for X equals Y equals O.

R$_2$ is hydrogen, straight, branched or cyclic alkyl, such as C$_1$–C$_{18}$ alkyl, —R$_3$(—NH$_2$)$_q$, alkylaryl or arylalkyl in which the alkyl part may contain 1–18 carbon atoms, —R$_3$(—NH—CR$_4$=O)$_q$, —CR$_4$=O, or poly lower alkyloxy groups that may have been terminally acylated or alkylated (e.g. —((CH$_2$)$_n$—O)$_n$.OR' where n is an integer 2, 3 or 4 and n' is an integer 2–100 and an H in CH$_2$ may have been replaced with methyl and R' may be any one of the expressly mentioned R$_1$ groups.

p=0 when Y=Br. p may be 1 when Y=O or S. p may be 2 when Y=N or S. p may be 3 for Y=N. In case there are more than one R$_2$, they may be identical or different.

R$_3$ is a straight, cyclic or branched alkyl, —O—alkyl, hydroxyalkyl, phenylalkyl, with up to 18 carbon atoms in the alkyl part.

R$_4$ is a straight, branched or cyclic alkyl group, such as C$_1$–C$_{18}$ alkyl.

q represents that one or more (1, 2, 3, 4 etc, i.e. 1-poly) hydrogens in a basic alkyl group R$_3$ may have been replaced with a respective primary amino group (—NH$_2$) or a respective —NH—CR$_4$=O group.

In the above-mentioned alkyl and acyl groups, one or more hydrogens may be optionally substituted with an amino or a hydroxy or an alkoxy group and carbon chains may be optionally broken at one or more locations by an ether oxygen or an amino nitrogen, the proviso being that there are at most one atom selected among oxygen and nitrogen binding to one and the same sp$^3$-hybridised carbon atom. Among particularly interesting alkyl groups with broken hydrocarbon chains may be mentioned those comprising repetitive alkylene oxide units, such as —CH$_2$CH$_2$—O—, —CH$_2$CH$_2$CH$_2$—O—, —CH$_2$CH(CH$_3$)—O— etc.

According to a further aspect of the invention a method of producing a coated polymer article is provided, characterized in derivatizing double bonds linked to the basic polymer structure (P) of the article through the group L.

According to yet another aspect of the invention a coated polymer article according to the invention is used as chromatography medium or as a support for the solid phase synthesis of an oligopeptide or an oligonucleotide.

With the present invention it is possible to apply a coating to any polymer article having double bonds on the surface and thus to modify the surface in a predetermined manner. Preferably the method is used to manufacture chromatographic media. It was found that a wide range of chromatography media can by synthesised by introducing different chemical structures on a porous polymer surface. A controlled amount of a desired group and/or charge can be introduced on the surface. With the method according to the invention the coating, including the desired group and/or charge, is evenly spread out over the surface also in the pores and then the pore size distribution is kept intact. Besides, the pore size distribution can be varied by varying the length of the groups introduced on the surface. The method is suitable for the production of reversed phase chromatography (RPC) media with the same performance as silica media but without the draw backs of silica. New RPC media are prepared by introducing polar groups containing long alkyl or amide groups close to the surface. By varying the length of the alkyl and amide chains, different matrices with various hydrophobicities and pore size distributions can be synthesised. Also primary and secondary amino groups may be introduced which are essential for the use of support in the synthesis of oligonucleotides.

According to the invention the double bond of a pending group is transformed to an halohydrin or vicinal halide, i.e. —CHX$_1$—CHY$_1$—, where at least one of X$_1$ and Y$_1$ is a substituent selected from halogens, in particular bromine, and the remaining group of X$_1$ and Y$_1$ is hydroxy or alkoxy, or to an epoxide or to corresponding nitrogen or sulphur analogues.

Halogen may be introduced by addition of certain halogen containing compounds, with the preferred halogen being bromine, to the double bonds present on the polymer surface. Bromine can be introduced by known methods such as reaction with Br$_2$ in a suitable solvents, or with N—Br—succinimide in a suitable solvent. The synthesis will now be illustrated by discussing the reaction with bromine. This does not exclude the use of other halogens, such as chlorine and iodine, which often undergo analogous reactions.

Preferably, in the first step of the method a polymer compound one or more double bonds of a polymer (P—L—CH=CH$_2$ with P and L having the same meaning as above) is reacted with Br$_2$ in a solution containing R$_1$OH or a mixture of H$_2$O and an organic solvent soluble in H$_2$O, whereby a coated polymer article having the structure

(1)

or a mixture of the structures: (1) and

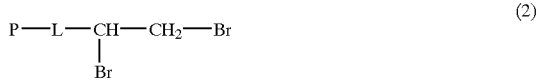

(2)

are obtained, where

R$_1$ is hydrogen or a straight, branched or cyclic alkyl group containing oxygen atoms as defined above. Particularly R$_1$ may be hydrogen or C$_1$–C$_{10}$ alkyl.

As mentioned above the method according to the invention can be used on polymer surfaces with free double bonds on the surface. As such polymer can be mentioned polymers from aromatic compounds containing vinylic groups. The aromatic compounds can be mono-functional, di- or poly-functional. The polymer should have a sufficient amount of di- or poly vinylic groups to result in a cross-linked structure. As suitable aromatic compounds can e.g. be mentioned styrene, divinylbenzene, vinylbenzene, vinylbenzylchloride, etylvinylbenzene, acetoxyvinylbenzene and other derivatives of vinylbenzene. In a preferred embodiment the basic polymer structure is a cross-linked polymer of styrene, divinylbenzene and ethylvinylbenzene or a polymer of divinylbenzene and ethylvinylbenzene. The pending groups are then benzene groups resulting from vinyl groups which have not been crosslinked. The structure can be described as follows:

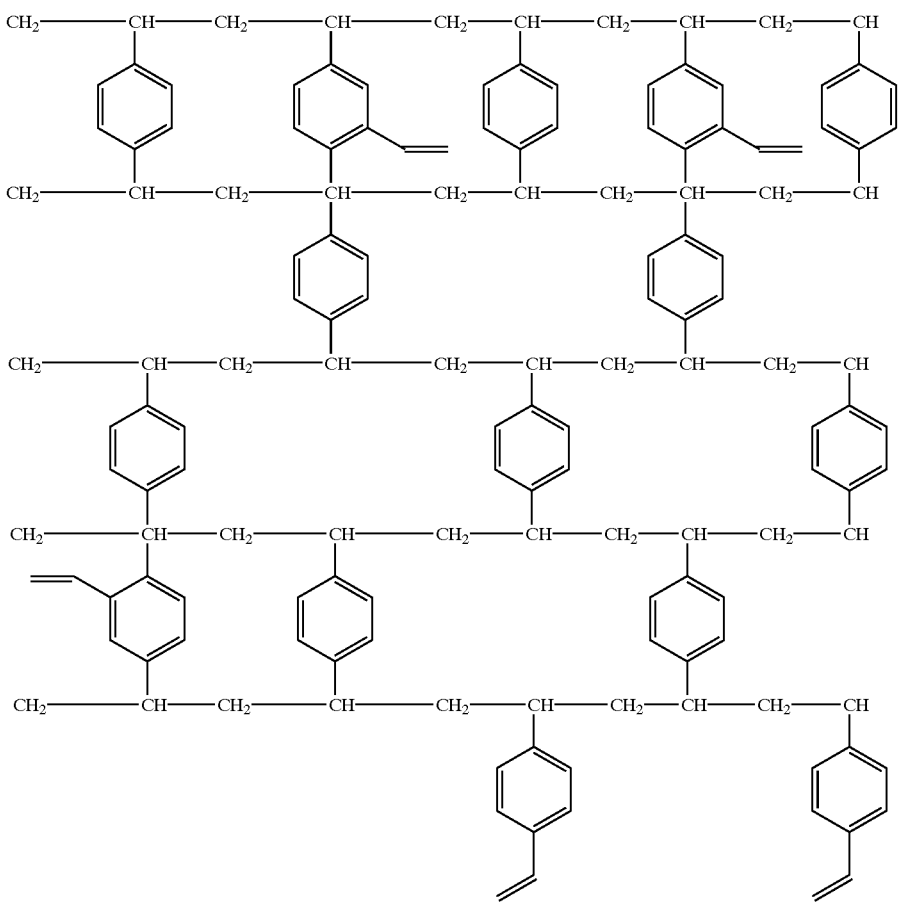

The free double bonds from the vinyl groups on the surface of the polymer are used for the reaction with bromine.

In preferred embodiments of the invention the coated articles are particles. Preferably the coated particles are prepared by coating uncoated particles-with a diameter of 1–200 μm, preferably 3–50 μm. The surface area of the uncoated particles lies within the range 1–1000 m²/g, preferably within 100–800 m²/g, and suitable pore volumes are from 0.1–3.0 ml/g. The content of residual vinyl groups in the beads are normally 0.3–7.7 mmol/g and should preferably be 0.3–3 mmole/g, most preferably 1–2 mmole/g.

In the first step of the invention the uncoated polymer article is contacted with bromine dissolved in the same solvent. Often the polymer article is in the form of particles which for coating purposes is suspended in the same solvent as bromine. In the reaction with bromine the choice of solvent is important for the outcome of the reaction. The reaction with bromine can result in a monobromide or in a dibromide or in a mixture thereof, as described above. Usually a mixture is obtained with a varying content of mono- and di-bromide. This content depends on the solvent used in the process. It is known that bromination in non-polar solvents like tetrachloromethane results in a high content of dibromide. In polar solvents like the lower alcohols, i.e. straight or branched $C_1$–$C_{10}$ alcohols, a high content of the monobromide is obtained. However, in water the amount of dibromide achieved is high due to the fact that bromine is partly soluble in water. If water is mixed with an organic solvent, soluble in water, and in which bromine dissolves, then the monobromide is obtained to a large extent. With longer alkyl groups the alcohols become more non-polar and then the amount of dibromide increases. Generally it can be said that if the polarity, expressed by the dielectric constant $\in$, for the solvents or solvent mixtures is low, a high content of dibromide will be obtained. If $\in$ is high the production of the monobromide will be favoured. In the present invention a high amount of the monobromide is preferred. Then, $\in$ between 6 and up to about 78 is preferred. Solvents suitable for the invention are $C_1$–$C_{10}$ alcohols such as methanol, ethanol, 1-propanol, 1-butanol, 1-hexanol. If a mixture of water and an organic solvent is used, solvents like tetrahydrofuran, lower alcohols are suggested. In this latter case R in the formula above will be H. There are many reports on the bromination reaction of vinyl groups. The following references can be mentioned: Yates, K, McDonald, R. S, and Shapiro., S. A., (1973 ): *J. Org. Chem.* 38, 2465; J. H. Rolston and K. Yates, (1969 ): *J. Am. Chem. Soc.* 91, 1469; R. C. Fahey, (1989 ): *Topics in stereochemistry*, Wiley, N.Y., p 280–286.

The reaction with bromine is suitably made at a temperature between –20–50° C., preferably 0–20° C. The amount of bromine used is suitably 0.1–10 moles bromine/mole vinyl, preferably 0.5–2 moles bromine/mole vinyl. The amount of monobromide obtained is also dependent of the bromine concentration. Concentrations of 0.05–0.5 moles/l solvent can be used, preferably 0.1–0.2 moles/l.

In the next step of the invention the brominated articles of the invention are reacted with a compound $Y(R_2)_p$ whereby a coated polymer article having the structure

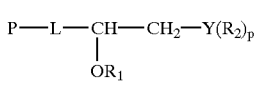  (3)

or a mixture of the structures (3) and

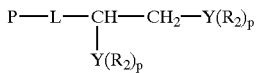  (4)

are obtained, where

Y=N, S, O, and $R_2$, $R_3$ and p have the same meaning as above.

The compound $Y(R_2)_p$ can be chosen from the group: ammonia, mono-di- or poly-alkylamines, mono-di- or poly-alkylalcohols, mono-di- or poly-alkylthiols, with the amine-, alcohol-, or thiol group respectively being a primary group. The alkyl group can be linear or branched and the length of the alkyl group is preferably not more than $C_{18}$ in order to comply with solubility requirements for the preferred solvents. The longer the alkyl group is the more hydrophobic the chromatographic media will be. Longer alkyl groups will also result in a reduction of small size pores (<50 Å in diameter) of the polymer article.

In the second step an aqueous suspension of the brominated articles is mixed with e.g. the amine. It is also possible to use a mixture of water and a lower alcohol like methanol or ethanol as suspension medium. The reaction temperature is suitably 50–100° C. and the reaction time about 24 h.

If the brominated articles are reacted with ammonia or a primary amine (mono, di or poly), coated polymer articles having the structure:

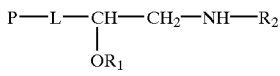  (5)

or a mixture of structures: (5) or a mixture of structures: (5) or

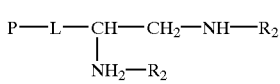  (6)

or the structure:

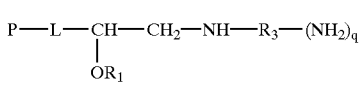  (16)

or a mixture of structures: (16) and

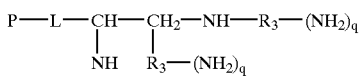  (17)

are obtained, where $R_1$, $R_2$, $R_3$ and q have the same meaning as above. These compounds can be further reacted with an acid chloride, acid anhydride or isocyanate:

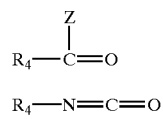  (7)

(8)

or whereby a coated polymer article having the structure (9)

or a mixture of the structures: (9) and

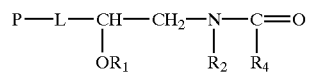  (10)

or having the structure:

(11)

or a mixture of the structures: (11) and (12)

or a coated polymer article having the structure:

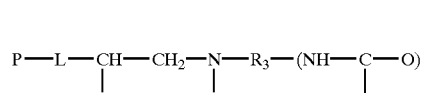  (18)

or a mixture of the structures: (18) and

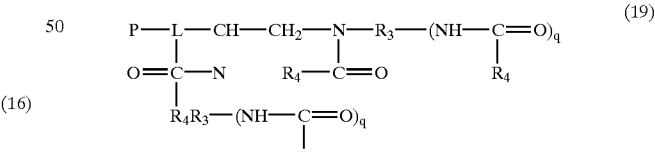  (19)

or the structure:

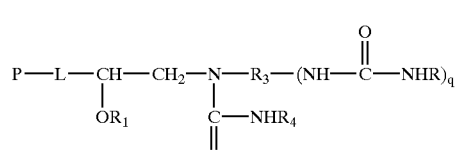  (20)

or a mixture of structures: (20) and

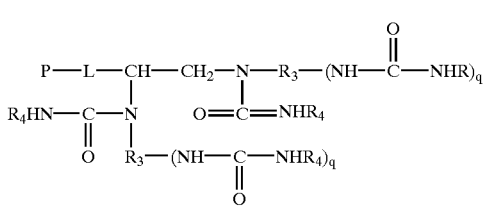
(21)

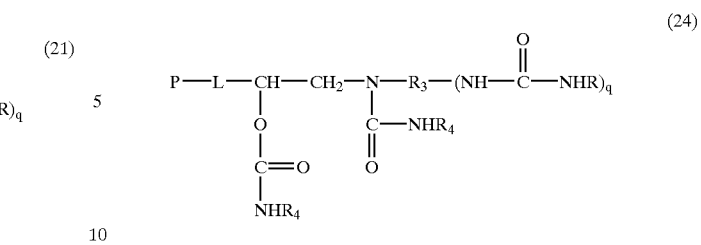
(24)

or having a mixture of the structures: (24) and (21) are obtained.

are obtained where $R_1$, $R_2$, $R_3$, and $R_4$ and q have the same meaning as above and Z is halogen, such as chloride.

The reaction of the amine substituents with an acid chloride, acid anhydride or isocyanate is made in a water free organic solvent such as acetone, or another suitable industrial ketone. The solvent must not contain groups capable of reacting with the acid chloride/anhydride or isocyanate. It is possible to use water if the temperature is kept below 15° C. During this reaction HCl is produced if an acid chloride is used. HCl can be neutralised with a tertiary amine, like di-isopropyl-ethylamine. The reaction is carried out at a temperature of 20–50° C. and the reaction time suitably 1–3 h.

As an alternative to this last reaction step and if the substituent $R_1$ is H, both the amine substituent and the hydroxyl group of formulae 5, 6, 16 and 17 may be reacted with an acid chloride, an anhydride or an isocyanate whereby a coated polymer article having the structure:

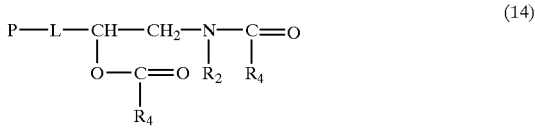
(14)

or a mixture of the structure: (14) and (10) or having the structure

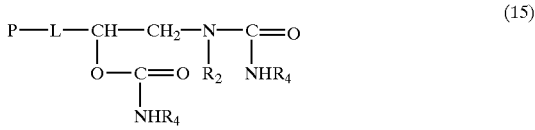
(15)

or a mixture of structures: (15) and (12) or having the structure:

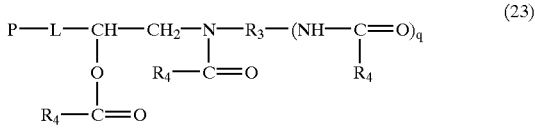
(23)

or a mixture of structures: (23) and (19), or having the structure:

The double bonds of the pending groups may also be converted to epoxide groups or corresponding sulphur or amino analogous by techniques well known in the art. For halohydrins or vicinal dihalides a proper adjustment of pH may result in epoxides, by doing this in the presence of the appropriate sulphur and amino compounds, the respective sulphur and nitrogen analogue will form. These three-membered rings will then be prone to undergo nucleophilic attack by the same compounds as outlined above for halohydrins and vicinal dihalides. The resulting products may then be further derivatized, also as outlined above. An alternative for obtaining epoxides is to react the double bond with a peroxy compound.

Further the introduced groups (coat) may then be further derivatized for instance to introduce charged groups such as $-SO_3^-$ (sulphonate), $-PO_3^{2-}$ (phospohonate), $-O-PO_3^{2-}$ (phosphate), charged ammonium groups (primary, secondary, tertiary and quaternary ammonium groups) (free valences bind to saturated or unsaturated carbon).

The coated polymer articles can be used as chromatography media of different types. By varying the grade of halogenation, for instance bromination, the type and amount of e.g. amine and the type and amount of acid halide, such as acid chloride, or isocyanate it is possible to manufacture particles with a great variety in surface characteristics. Thus, with the invention it is possible to tailor the surface characteristics for the different molecules that are to be chromatographically separated. According to a preferred embodiment of the invention the coated articles are used as RPC media.

The introduction of primary or secondary amino groups will enable that the inventive article can be used in the solid phase synthesis of oligonucleotides and oligopeptides.

The invention will now be illustrated by the following examples which however are not intended to limit the invention. With parts and percent are meant parts by weight and percent by weight if not explicitly stated otherwise.

In the reactions divinylbenzene particles are used. The particles have the following characteristics: Particle size: 15 $\mu$m; surface area: 714 m$^2$/g; pore size: 2.2.ml/g; 1.5 mmol vinyl groups/g. Starting from these particles, eleven different coated particles for RPC were synthesised by varying the length of the alkyl and amide chains. The obtained coated particles were tested by separation of peptides and compared with the uncoated particle and with a conventional silica particle, Kromasil™ C18 (from Eka Nobel AB).

Experimental Part

EXAMPLE 1

100 g of divinylbenzene particles in ethanol (amount of dry substance 10.6%) were washed with ethanol and added to a reactor and cooled to 15° C. 25.50 g of bromine (1.60 mmol/g particles) were dissolved in 400 g ethanol and added in portions over a time period of 15 minutes. The particles were washed with ethanol after two hours.

EXAMPLE 2

31.18 g hexylamine were added to 199.90 g aqueous suspension (dry content: 20.0 g) of the brominated particles from example 1. Heating to 90° C. was started at the same time. After 24 hours 300 ml ethanol m/10% isopropanol were added during a period of 10 minutes. The suspension was agitated for 25 minutes and then filtrated and washed with 0.8 l water, 1.6 l 0.1 M NaOH and 2.0 l water.

EXAMPLE 3

43.51 g hexadecylamine were added to 120.0 g aqueous suspension (dry content: 12.0 g) of the brominated particles from example 1. Heating to 90° C. was started at the same time. After 24 hours 180 ml ethanol m/10% isopropanol were added during a period of 10 minutes. The suspension was agitated for 25 minutes and then filtrated and washed with 0.4 l ethanol m/10% isopropanol, 0.48 l water, 1.0 l 0.1 M NaOH and 1.2 l water.

EXAMPLE 4

7.5 ml lauroyl chloride and 0.95 ml diisopropylethylamine were added to 90.13 suspension (dry content: 9.0 g) of the particles from example 2 in dry acetone at ambient temperature. After 2 hours the suspension was filtered and washed with 360 ml acetone and 360 ml ethanol.

EXAMPLE 5

4.35 ml capryloyl chloride and 0.95 ml diisopropylethylamine were added to 90.0 g suspension (dry content: 9.0 g) of the particles from example 2 in dry acetone at ambient temperature. After 2 hours the suspension was filtered and washed with 360 ml acetone and 360 ml ethanol.

EXAMPLE 6

4.25 ml lauroyl chloride and 0.55 ml diisopropylethylamine were added to 51.0 g suspension (dry content: 5.10 g) of the particles from example 3 in dry acetone at ambient temperature. After 2 hours the suspension was filtered and washed with 200 ml acetone and 200 ml ethanol.

EXAMPLE 7

2.45 ml capryloyl chloride and 0.55 ml diisopropylethylamine were added to 50.96 g suspension (dry content: 5.10 g) of the particles from example 3 in dry acetone at ambient temperature. After 2 hours the suspension was filtered and washed with 200 ml acetone and 200 ml ethanol.

EXAMPLE 8

16.65 g of 1,3 diaminopropane (15 mmol/g particles) were added to 15 g of the particles from example 1, in water (149.5 g suspension). The mixture was heated to 90° C. for 25 hours and 40 minutes and then washed with water, NaOH (0.5 M), water, 20% ethanol and acetone.

EXAMPLE 9

6.00 g of the aminated particles from example 8 were washed with dry acetone. Capryloyl chloride (9.18 g, 9.4 mmol/g particles) and N-ethyldiisopropylamine (1.10 g, 1.4 mmol/g particles) were added to 60 g of acetone suspension. After two hours in room temperature the particles were washed with acetone and ethanol.

EXAMPLE 10

33.37 g of 2,2-ethylenedioxydiethylamine (15 mmol/g particles) were added to 15 g of the particles from example 1 in water (150.20 suspension). The mixture was heated to 90° C. After 24 hours the particles were washed with water, NaOH (0.5 M), water and acetone.

EXAMPLE 11

26.38 g of hexanediamine (15 mmol/g particles) were added to 15 g of the particles from example 1 in water (149.97 g suspension). The mixture was heated to 90° C. After 24 hours the particles were washed with water, NaOH (0.5 M), water and acetone.

EXAMPLE 12

6.00 g of the aminated particles from example 8 were washed with dry acetone. 9.55 g (7.3 mmol/g particles) lauroyl chloride and 1.11 g (1.4 mmol/g particles) N-ethyldiisopropylamine were added to 60 g acetone suspension. After 2 hours at room temperature the particles were washed with acetone and ethanol.

EXAMPLE 13

6.00 g of the aminated particles from example 10 were washed with dry acetone. 9.21 g (7.0 mmol/g particles) lauroyl chloride and 1.11 g (1.4 mmol/g particles) N-ethyldiisopropylamine were added to 60 g acetone suspension. After 2 hours at room temperature the particles were washed with acetone and ethanol.

EXAMPLE 14

6.00 g of the aminated particles from example 10 were washed with dry acetone. 5.68 g (5.8 mmol/g particles) capryloyl chloride and 1.10 g (1.4 mmol/g particles) N-ethylisopropylamine were added to 60 g acetone suspension. After 2 hours at room temperature the particles were washed with acetone and ethanol.

EXAMPLE 15

6.00 g of the aminated particles from example 11 were washed with dry acetone. 9.20 g (7.0 mmol/g particles) lauroyl chloride and 1.10 g (1.4 mmol/g particles) N-ethyldiisopropylamine were added to 60 g acetone suspension. After 2 hours at room temperature the particles were washed with acetone and ethanol.

EXAMPLE 16

6.00 g of the aminated particles from example 11 were washed with dry acetone. 5.65 g (5.8 mmol/g particles) capryloyl chloride and 1.10 g (1.4 mmol/g particles) N-ethylisopropylamine were added to 60 g acetone suspension. After 2 hours at room temperature the particles were washed with acetone and ethanol.

EXAMPLE 17

10 g of the porous particles in methanol (dry content 12.4%) were added to a reactor and cooled to 15° C. 2.53 g of bromine (1.58 mmol/g particles) were added in portions with a glass syringe over 15 minutes. The particles were washed with methanol.

EXAMPLE 18

15.93 g of hexylamine (17 mmol/g particles) were added to 9.14 g of the particles from example 17 in water (91.0 g suspension). The mixture was heated at 90° C. for 24 hours, and then washed with water, sodium hydroxide (0.5 M), water, methanol and acetone.

EXAMPLE 19

7.00 g of the aminated particles from example 18 were washed with acetone. 5.18 g (3.5 mmol/g particles) dodecylisocyanate were added to 62 g acetone suspension of the particles and heated, first at 30° C. for 1 hour 35 minutes, and then at 50° C. for 1 hour. The particles were washed with acetone and ethanol.

The obtained final particles were used in chromatografic testing by separation of peptides accordingly:

EXAMPLE 20
Separation of Peptides I

A peptide mixture consisted of (Ile$^7$)-Angiotensin III, (Val$^4$)-AngiotensinII, AngiotensinIII and AngiotensinI.

Sample:
    0.125 mg/ml Ile$^7$)-Angiotensin III
    0.125 mg/ml (Val$^4$)-AngiotensinII
    0.125 mg/ml AngiotensinIII
    0.125 mg/ml AngiotensinI The peptides are dissolved in Solution A.

Solution A: 0.1% trifluoro-acetic (TFA) acid in water. 1 ml TFA is dissolved in 1000 ml deionized water.

Solution B: 60% acetonitrile/0.1% trifluoro-acetic acid (TFA) 0.600 ml acetonitrile was dissolved in 400 ml deionized water and 1 ml TFA.

Gradient:
    0–2 col. vol. 15%B
    2–22 col. vol. 15–65%B
    22–25 col. vol. 65%B
    25–27 col. vol. 15%B Injection volume: 25 μL
Linear velocity: 300 cm/h
Detector: UV 214 nm, 0.2 AU

| Peptides | Sequence | Supplier |
| --- | --- | --- |
| (Ile$^7$) - Angiotensin III | Arg-Val-Tyr-Ile-His-Pro-Ile | Sigma A-0911 |
| (Val$^4$) - Angiotensin III | Arg-Val-Tyr-Val-His-Pro-Phe | Sigma A-6277 |
| Angiotensin III | Arg-Val-Tyr-Ile-His-Pro-Phe | Sigma A-0903 |
| Angiotensin I | Asp-Arg-Val-Tyr-Ile-His-Pro-Phe-His-Leu | Sigma A-9650 |

Peptide Separation II

The angiotensins were all positively charged at this pH and applied as a mixture. The retention time ($t_R$), capacity factor (k) and selectivity (separation factor α) were determined.

Column: Glass column Pharmacia HR 5/5 (vol.:1 ml)
Mobile phase A: 0.1% TFA
Mobile phase B: 0.1% TFA/60% acetonitrile
Gradient: 9–39% acetonitrile in 20 minutes
Injection: 25 μl of 0.5 mg/ml angiotensin mixture
Flow rate: 5 cm/min (1 ml(min)
Detector: 214 nm, 0.2 AU
System: FPLC® (Chromatography system from Pharmacia Biotech)

Before applying the sample a gradient was run on every column, and the columns were equilibrated with 10 column volumes of 15% mobile phase B (9% acetonitrile).

Separation of Peptides III

The angiotensins were separated due to their differences in hydrophobicty in an ascending gradient of acetonitrile.

The results are presented in the tables below and in the chromatograms.

The retention time $t_R$ is the time between the start of elution and the emergence of the peak maximum. The retention time is presented in table 1. The retention volume $V_R$ is the corresponding volume of mobile phase between the start of elution and emergence of the peak.

The separation factor α is a measure of how well two peaks are separated. It is given by the ratio of the capacity factors of the two peaks($k_2/k_1$). The separation factor is presented in table 2.

TABLE 1

| Media | Ile7 tR | Val4 tR | AIIII tR | AI tR | Amines | Acid chloride/ Isocyanate |
| --- | --- | --- | --- | --- | --- | --- |
| Example 4 | 7.6 | 8.11 | 9.23 | 11.12 | Hexylamine | Lauroyl-chloride |
| Example 5 | 7.1 | 7.79 | 8.87 | 10.62 | Hexylamine | Capryloyl-chloride |
| Example 6 | 7.83 | 8.35 | 9.51 | 11.45 | Hexadecyl-amine | Lauroyl-chloride |
| Example 7 | 7.53 | 8.07 | 9.2 | 11.08 | Hexadecyl-amine | Capryloyl-chloride |
| Example 9 | 5.1 | 5.99 | 7.14 | 9.12 | 1,3-diamino-propane | Capryloyl-chloride |
| Example 12 | 5.82 | 6.48 | 7.7 | 9.65 | 1,3-diamino-propane | Lauroyl-chloride |
| Example 13 | 4.94 | 5.82 | 7.16 | 9.42 | 2,2-ethylene-dioxy-diethyl-diamine | Layroyl-chloride |
| Example 14 | 3.88 | 5.1 | 6.58 | 8.78 | 2,2-ethylene-dioxy-diethyl-diamine | Capryloyl-chloride |
| Example 15 | 6.02 | 6.68 | 7.98 | 10.15 | 1,6-diamino-hexane | Lauroyl-chloride |
| Example 16 | 5.52 | 6.35 | 7.61 | 9.62 | 1,6-diamino-hexane | Capryloyl-chloride |
| Example 19 | 6.99 | 7.59 | 8.74 | 10.58 | Hexylamine | Dodecyl-isocyanat |

TABLE 1-continued

| Media | Ile7 tR | Val4 tR | AIIII tR | AI tR | Amines | Acid chloride/Isocyanate |
|---|---|---|---|---|---|---|
| Unmodified | 9.16 | 9.91 | 11 | 12.69 | none | none |
| Kromasil C18 | 10.68 | 10.95 | 12.07 | 13.49 | none | none |

TABLE 2

| Media | αIle7-Val4 | αVal4-AIII | αAIII-AI |
|---|---|---|---|
| Ex. 4 | 1.07 | 1.14 | 1.20 |
| Ex. 5 | 1.10 | 1.14 | 1.20 |
| Ex. 6 | 1.07 | 1.14 | 1.20 |
| Ex. 7 | 1.07 | 1.14 | 1.20 |
| Ex. 9 | 1.17 | 1.19 | 1.28 |
| Ex. 12 | 1.11 | 1.19 | 1.25 |
| Ex. 13 | 1.18 | 1.23 | 1.32 |
| Ex. 14 | 1.31 | 1.29 | 1.33 |
| Ex. 15 | 1.11 | 1.19 | 1.27 |
| Ex. 16 | 1.15 | 1.20 | 1.26 |
| Ex. 19 | 1.09 | 1.15 | 1.21 |
| Unmodified | 1.08 | 1.11 | 1.15 |
| Kromasil C18 | 1.03 | 1.10 | 1.12 |

The modified media are all more hydrophilic than the unmodified media and also more hydrophilic than the silica media used for comparison. The retention times are related to the polarity of the synthesised media. The lower the retention times, the lower the concentration of the sample in the stationary phase, the more polar the surface. The media synthesised using lauroyl chloride have higher retention times than those where capryloyl chloride were used. The most polar media were media prepared with diamines and capryloyl chloride according to example 9 and example 14. This is evident from table 1 where the tR values are the lowest for example 9 and 14. In accordance with this the peaks in the chromatograms appears first in example 9 and 14. As can be seen from the chromatograms all peaks from the examples according to the invention appears before the peaks for the unmodified medium and the silica medium indicating that the particles according to the invention are more hydrophilic. Thus, the surface modifications according to the invention has a pronounced effect on the concentration of acetonitrile used for elution. A lower amount of acetonitrile used for elution leads to large savings in the cost of organic solvents.

The difference in selectivity factors shows that the separation between the peptides can easily be changed by the surface modifications so that a separation problem can be optimised by small changes in the production method.

The media synthesised from monosubstituted amines have lower separation factors than those synthesised from disubstituted amines. The diamino media were separating (Ile$^7$) Angiotensin III and (Val$^4$) Angiotensin III much better and gave larger variation in the separation than the media based on monoamines.

The media according to example 9 and 14 had also the highest separation factor for (Ile$^7$) Angiotensin III and (Val$^4$)Angiotensin III which is evident from table 2 and the peak separation in the chromatograms. Generally it can be seen from the chromatograms that the separation with the media according to the invention is also much better than with the unmodified medium or the silica medium. Kromasil does not separate the peptides properly as the peaks are not separated.

During the priority year we have shown that coatings in which the alkyl groups of $R_1$ and/or $R_2$ are repetitive units of lower alkenyloxy groups, such as —$CH_2CH_2$—O—, —$CH_2CH_2CH_2$—O—, —$CH_2CH_2(CH_3)$—O—, and have molecular weights up to at least 5000 dalton will function in chromatographic applications.

During the priority year we have also introduced amino groups for making the beads suitable for solid phase oligonucleotide synthesis.

Addition of bromine: 10 gram of ice were washed with 300 ml 0.5 M sodium acetate buffer pH 5.62 g of poly (divinylbenzene-ethylvinylbenzene) particles in sodium acetate buffer pH 5.0 were transferred to a 100 ml reactor. The temperature were set to 15° C. Then 2.40 g bromine (1:1 Mmol bromine/mmol vinyl) was dissolved in 65 g sodium acetate buffer pH 5 and added to the reactor. After 5 minutes the particles were washed with 500 ml water.

Reaction with ammonia: 10 g particles were transferred to a 100 ml reactor with 54.4 g 25% ammonia solution. The temperature was increased to 60° C. and the suspension was stirred mechanically at 300 rpm. After 16 hours the mixture was washed with 700 ml of water an 300 ml of 20% ethanol. Amine: 0.30 mmol amine/g particles.

The amine content was found to be 0.30 mmol/gram particles by titration of the hydrochloric acid amine salt by silver nitrate.

The aminated particles so obtained have been successfully used in solid phase oligonucleotide synthesis by conventional methods.

What is claimed is:

1. A coated polymer article wherein the coating is covalently bound to the polymer surface via double bonds of the polymer, comprising

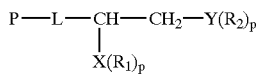

a) P comprises a basic polymer and further groups

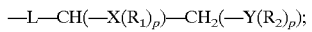

b) L is a part of a pending group i) projecting from the basic polymer and ii) comprising a double bond that has been utilized for introducing —$X(R_1)_p$ and —$Y(R_2)_p$;

c) X and Y are independently selected from halogens, in particular Br, and N, S and O;

d) $R_1$ is hydrogen, a straight, branched or cyclic alkyl or acyl group, such as $C_1$–$C_{10}$ alkyl, $C_1$–$C_{18}$ acyl, or $R_2$ when X is N, O or S with particular emphasis for X equals Y equals O;

e) $R_2$ is hydrogen, straight, branched or cyclic alkyl such as $C_1$–$C_{18}$ alkyl, —$R_3$(—$NH_2$)$_q$, alkylaryl or arylalkyl in which the alkyl part may contain 1–18 carbon atoms, —$R_3$(—NH—$CR_4$=O)$_q$, —$CR_4$=O or poly lower alkyloxy groups that may have been terminally acylated or alkylated;

f) p is an integer 0–3, with the provision that when X is halogen p equals O, when X is O p equals 1, when X is S p equals 1 or 2, and when X is N p equals 1, 2 or 3, and with the further provision that for p equals 2 or 3 the two or three groups $R_2$ may be identical or different;

g) $R_3$ is a straight, cyclic or branched alkyl, —O-alkyl, hydroxyalkyl, phenylalkyl, with up to 18 carbon atoms in the alkyl part, and $R_4$ is a straight, branched or cyclic alkyl group, such as $C_1$–$C_{18}$ alkyl;

h) q is an integer >0 representing that one or more hydrogens in $R_3$ may have been replaced with a respective primary amino group (—$NH_2$) or a respective —NH—$CR_4$=O group.

2. A coated polymer article according to claim 1, wherein said basic polymer of the article is cross-linked polystyrene-divinylbenzene and L is a benzene ring.

3. A coated polymer article according to claim 1, wherein said article is in the form of particles with a diameter of 3–100 μm.

4. Method of performing chromatographic separation, said method comprising contacting the material to be separated with a separation medium comprising said polymer article according to claim 1.

5. Method of performing solid phase oligonucleotide synthesis, said method comprising synthesizing oligonucleotides on a solid support comprising said polymer article according to claim 1, exhibiting primary or secondary amino groups.

6. Method of performing reverse phase chromatography said method comprising contacting the material to be separated with a medium comprising said polymer article according to claim 1.

* * * * *